United States Patent [19]
Coleman et al.

[11] 3,851,334
[45] Nov. 26, 1974

[54] COLLISION AVOIDANCE AND STATION KEEPING ANTENNA SYSTEM

[75] Inventors: H. Paris Coleman, Alexandria, Va.; Walton B. Bishop, Oxon Hill, Md.

[73] Assignee: The United States of America as represented by the Secretary of the Navy, Washington, D.C.

[22] Filed: Sept. 19, 1972

[21] Appl. No.: 290,427

[52] U.S. Cl............................................ 343/6.5 R
[51] Int. Cl............................................ G01s 9/56
[58] Field of Search...................... 343/6.5 R, 6.5 LC

[56] References Cited
UNITED STATES PATENTS

| | | | |
|---|---|---|---|
| 3,153,232 | 10/1964 | Fletcher et al. | 343/6.5 LC X |
| 3,312,971 | 4/1967 | Gehman | 343/6.5 LC |
| 3,409,888 | 11/1968 | Speer, Sr. | 343/6.5 R |
| 3,412,399 | 11/1968 | Chisholm | 343/6.5 LC |

*Primary Examiner*—Malcolm F. Hubler
*Attorney, Agent, or Firm*—R. S. Sciascia; Arthur L. Branning

[57] ABSTRACT

A method of applying a circularly symmetric antenna system to collision avoidance and station keeping with the ability to respond retrodirectively. Specifically, airborne or surface vehicles may employ a method which determines the relative bearing between the vehicles from a single interrogation of one vehicle by the other.

5 Claims, 3 Drawing Figures

COLLISION AVOIDANCE AND STATION KEEPING ANTENNA SYSTEM

BACKGROUND OF THE INVENTION

Due to the increased number of military and civilian aircraft, extra precautions must be taken to avoid collisions. In fact much time and money has been spent to develop a collision avoidance system (CAS).

There are two philosophies to the solution of CAS problem. The first is to coordinate all aircraft positions through a ground station which is in charge of a particular geographical area. The major problem encountered in this type of solution is the complexity of the system and the necessity of maintaining a track on all targets while simultaneously computing possible collision courses. The second method in the solution to a CAS problem is to eliminate the ground station, and maintain an expensive computer/radar system aboard each aircraft, no matter how small, such that the aircraft is appraised of all other airccraft positions. Obviously this method would be prohibitively expensive and requires 100 percent participation to be effective.

Considering such drawbacks we have developed a relatively inexpensive system capable of determining relative bearing information between two surface vehicles or between two aircraft. The information may be obtained from a single interrogation of one vehicle by the other.

SUMMARY OF THE INVENTION

A multi-mode antenna system is employed to provide one of the two inputs to provide a three-dimensional collision avoidance system. Each vehicle is equipped with the antenna system and the direction and bearing of the transponding vehicle are determined by a single interrogation. Thus, in the case of aircraft, if altitude information is encoded into the return signal, a collision avoidance system results.

OBJECTS OF THE INVENTION

It is an object of the invention to provide a method of employing a multimodal antenna system for collision avoidance.

Another object of this invention is to provide relative bearing information between two aircraft for collision avoidance reasons by a single interrogation of one vehicle by another.

A further object of the invention is to provide a system capable of being used in combination with beacon transponder circuits.

Other objects, advantages and novel features of the invention will become apparent from the following detailed description of the invention when considered in conjunction with the accompanying drawings wherein:

DRAWINGS

DETAILED DESCRIPTION

Figure 1:
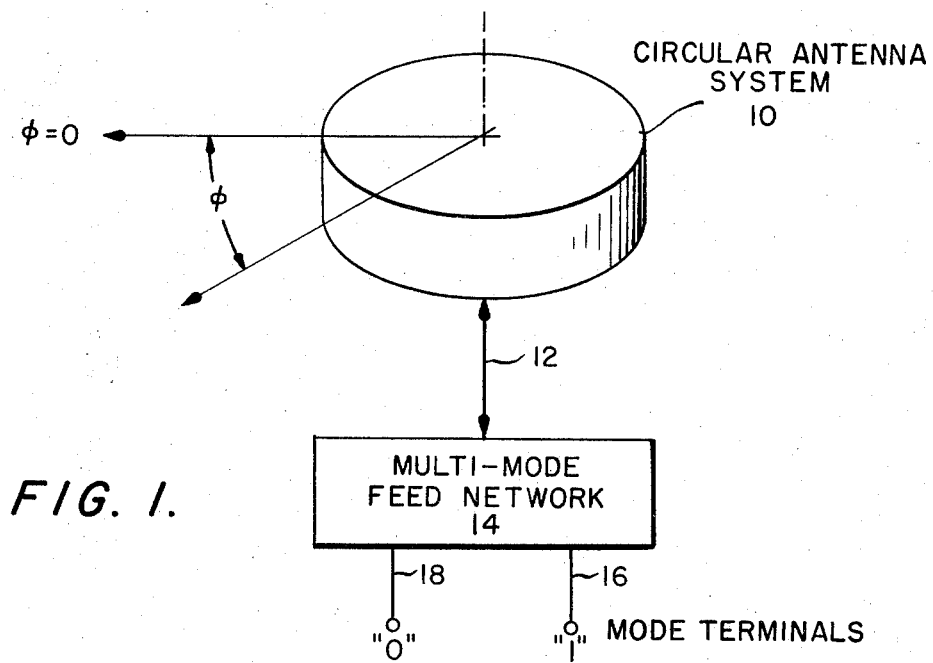
FIG. 1 is a drawing of the apparatus required to practice the method of providing relative bearing information.

Referring to FIG. 1, circular antenna system 10 is coupled to multi-mode feed network 14 by way of interconnecting line 12.

The antenna 10 may be of a multitude of types including a circular continuous aperture antenna, or an array of discrete radiating elements having circular symmetry; for example an array of dipoles equally spaced and arranged on a circle, concentric with a conducting cylinder. The selection of any particular antenna system 10 largely depends upon the well known design considerations such as a maximum or minimum size requirement, weight, gain, element spacing, and the other usual requirements. However, any type of electromagnetic system which has the capability of propagating progressively varying phase functions around the entire periphery, in the far field is acceptable for antenna system 10. Furthermore, consideration must be made for the antenna placement upon the vehicle.

The interconnecting lines 12 are employed so as to provide a connection between the antenna system 10, and the feed network 14, and are chosen as a result of the selection of the antenna system and the feed network. For example, if the antenna system 10 consisted of an N element array, the interconnecting lines 12 could consist of N number of coaxial cables. The selection of any particular interconnecting line 12 is unimportant to the overall operation of this system as long as the interconnecting lines 12 are capable of accurately maintaining amplitude and phase relationship information between the antenna system 10 and the feed network 14.

The feed network 14 is responsible for creating a progressive change in the phase of energy at a constant radius in the far field. If a point at a fixed radius in the far field is allowed to vary in angle $\phi$, with respect to antenna 10 as shown in FIG. 1, the network 14 must provide a particular phased signal at any particularly defined angle $\phi$, as described in detail in application Ser. No. 220,663.

The operation of this collision avoidance and station keeping system requires the use of at least two of the antenna modes as described in the above-mentioned application.

Although many modes may be used in this method, the operation will be described for the case where only modes "0" and "1" are used for the sake of simplicity. From the discussion below, it will become apparent that other mode pairs, or a multitude of mode pairs may be utilized.

As shown in FIG. 1 the system has modal response of numbers 0 and 1. Consider a plane wave incident upon the antenna from the azimuth direction $\phi = \phi_o$. The voltage appearing at the mode 0 terminal will be of the form:

$$\vec{S_o} = A_o. \tag{1}$$

That is to say the phase of the voltage is independent of the azimuth angle of arrival of the plane wave. The voltage appearing at the mode 1 terminal, however, is of the form:

$$\vec{S}_1 = A_1 e^{j\phi_0}. \tag{2}$$

That is, the phase of the voltage varies linearly with the angle of arrival of the plane wave.

A phase comparison between the two mode terminals, therefore, allows an immediate determination of the angle $\phi_0$.

Figure 2:
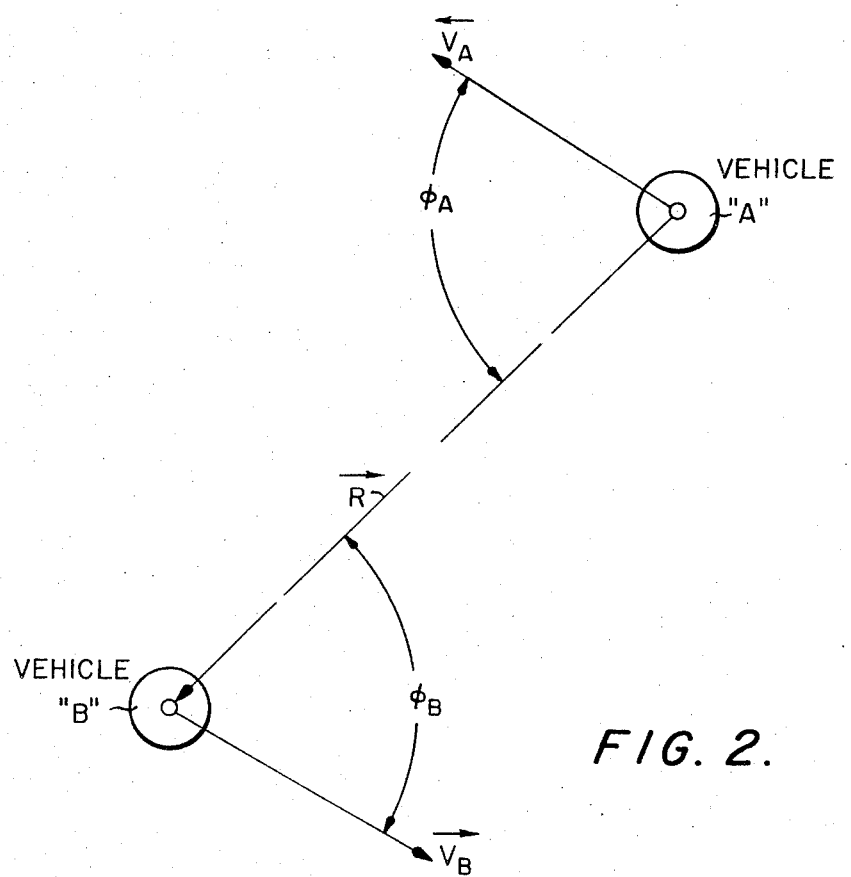
FIG. 2 depicts two vehicles, each equipped with the device shown in FIG. 1, separated by a distance R.

Referring to FIG. 2, vehicles A and B are separated by a distance $\vec{R}$ and each have a velocity $\vec{V}_A$ and $\vec{V}_B$. Each vehicle is equipped with an antenna system having the two modal responses. As shown in FIG. 1 vehicle A transmits an interrogation, either from antenna 10 or from a separate independent antenna (not shown). This interrogation is received by vehicle B, a phase comparison is made in the manner described above and angle $\phi_B$ is determined. The value of $\phi_B$ may be encoded and retransmitted by vehicle B. Retransmission may occur on mode "0," on mode "1" or on both modes combined to form a retrodirective beam. When vehicle A receives the response on modes "0" and "1" of its antenna, that system completes a phase comparison as described above to determine angle $\phi_A$, and decodes to obtain $\phi_B$. Thus the direction and bearing of the transponding vehicle are determined by the interrogating vehicle from a single interrogation.

Figure 3:
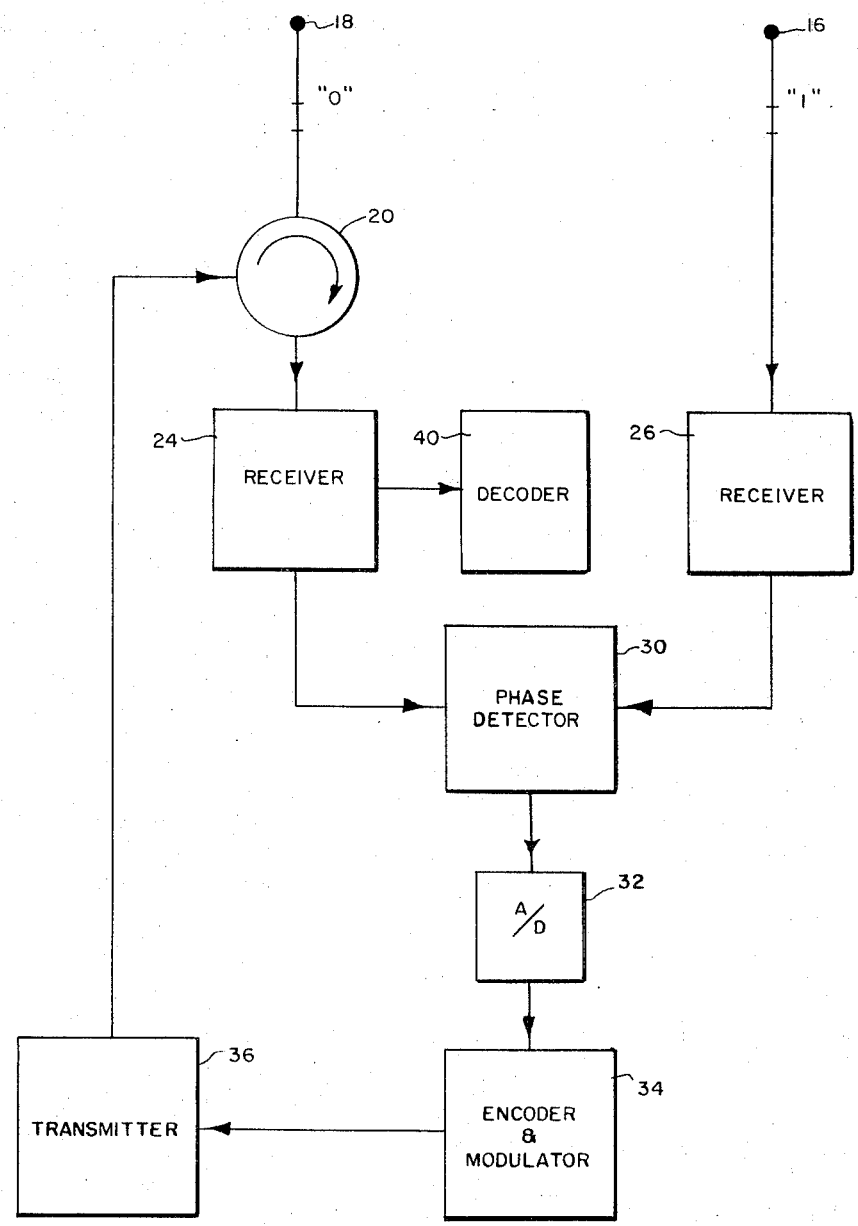
FIG. 3 shows typical equipment that may be connected to the mode terminals of the feed net work of FIG. 1 to determine the relative bearing between vehicle A and B.

FIG. 3 shows the structure typical of that located in both vehicles A and B to effect the method of determining the bearing between the two vehicles from a single transmission. Specifically with reference to the above paragraph, FIG. 3 shows the structure capable of being coupled to the mode terminals of the antenna system of FIG. 1. For the purpose of explanation, consider the equipment, as shown in FIG. 3, as being located in vehicle B. The interrogation is received by receivers 24 and 26. A phase comparison is made by a phase detection 30 and the angle $\phi_B$ is determined in the manner described above. The value of $\phi_B$ may be encoded and modulated by the use of the A/D converter 32 and encoder, modulator 34. The encoded signal may be retransmitted by transmitter 36 through circulator 20 to the multimodal feed network of FIG. 1. When similar equipment is located on vehicle A, vehicle B's response is obtained, a phase comparison is made to determine $\phi_A$ and decoded to obtain $\phi_B$.

Normally range and range rate are known from normal radar operation. This information coupled with the bearing and direction information as determined above satisfies the requirements for collision prediction and avoidance system for vehicles in the same plane. In the case of aircraft, altitude information may be encoded separately by way of a transponder so as to produce three dimensional collision avoidance system.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A method of determining the direction and bearing between a first and a second vehicle comprising:
   interrogating said first vehicle by transmitting a first signal from said second vehicle; said first vehicle receiving said first signal and then
   determining the bearing of said second vehicle; encoding the bearing of said second vehicle to form a second signal and
   transmitting said second signal;
   receiving said second signal by said second vehicle;
   determining the bearing of the first vehicle; and
   decoding said second signal to obtain the bearing information from the second signal.

2. The method as claimed in claim 1 wherein both vehicles are in motion.

3. The method as claimed in claim 1 wherein one of the two vehicles is in motion.

4. The method as claimed in claim 1 wherein said vehicles are operated on a two dimensional plane.

5. The method as claimed in claim 1 wherein said vehicles are operated in a three dimensional space.

* * * * *